Oct. 1, 1968 R. L. SNYDER 3,404,384

WIRE MEMORY STORAGE SYSTEM

Filed Oct. 31, 1963 2 Sheets-Sheet 1

INVENTOR.
RICHARD L. SNYDER,
BY
Walter J. Adam
ATTORNEY.

Oct. 1, 1968 R. L. SNYDER 3,404,384

WIRE MEMORY STORAGE SYSTEM

Filed Oct. 31, 1963 2 Sheets-Sheet 2

Patented Oct. 1, 1968

United States Patent Office 3,404,384

3,404,384

WIRE MEMORY STORAGE SYSTEM

Richard L. Snyder, Fullerton, Calif., assignor to Hughes Aircraft Company, Culver City, Calif., a corporation of Delaware Filed Oct. 31, 1963, Ser. No. 320,349
5 Claims. (Cl. 340—174)

ABSTRACT OF THE DISCLOSURE

A reliable and simplified woven memory system that utilizes storage and inductive selection elements of magnetic wires having conductors wound or spun therearound in helices, which elements are in turn woven with sense and control conductors to form a single structure that provides both the storage and selection functions. Biasing arrangements are included in the woven structure to provide isolation between adjacent bit positions along the storage wire. The helical conductors of the storage elements and of the selection elements have a pitch ratio selected to provide reliable current control during selection and switching operations.

This invention relates to magnetic memory systems and particularly to an improved and simplified word organized wire memory array.

In conventional magnetic memory systems, information is stored in binary fashion in toroidal shaped magnetic cores having appropriate conductors passing or threaded through the openings thereof. This type of memory system has been found to be characterized by difficult and expensive winding and construction problems because each core must be individually threaded with the required conductors. Even in core memory systems operating in a word organized arrangement which may have only two wires threading each core, the cost of memories is relatively high, especially for large capacity storage systems. A storage system utilizing ferromagnetic wires woven into a memory structure such as by weaving looms would eliminate the time consuming and difficult threading operations of toroidal shaped cores which must be performed manually or with highly complicated machines. Another improvement of memory systems is described and claimed in an application, Ser. No. 200,027, "Word Organized Magnetic Memory Selection and Driving System," by Richard L. Snyder, filed on June 1, 1962, now Patent No. 3,278,911, and assigned to the same assignee as the subject application. In the system of the above-mentioned application, an improved reactive selection arrangement is described and claimed that has a saturating inductor connected in series with each word line, with the series path of each word line and saturating inductor connected between row and column selection conductors. By impressing a positive voltage pulse of unit amplitude on one of the row selection conductors and a negative voltage pulse of unit amplitude on one of the column selection conductors, the inductor connected between these two conductors will have two units of voltage impressed thereacross. Only one unit of voltage is impressed across the inductor and word line paths connected to only one of the two active selection conductors. Switching in the selected word line is thus affected by a time discriminating process because the selected inductor saturates to pass a switching current through the selected word line before the unselected inductors become saturated and pass more than a relatively small current therethrough. This inductive selection arrangement results in a relatively small amount of noise being generated by unselected word lines while eliminating the pair of diodes that is conventionally required for each word line. A memory system that utilizes magnetic wires for storage and utilizes switching of saturating inductors for selection with the entire arrangement being woven into a common structure would, while providing highly reliable operation, be a relatively low cost device and be an advance to the memory art.

It is therefore an object of this invention to provide a woven wire memory system utilizing cores of an elongated magnetic medium.

It is a further object of this invention to provide a memory storage element of magnetic wire having a conductor arrangement wound thereon.

It is a still further object of this invention to provide in a memory system having wires of magnetic material along which information is stored in magnetic regions, an arrangement for providing isolation between the regions.

It is another object of this invention to provide a simplified woven wire memory utilizing a reactive selection arrangement and having the reactor woven into the memory structure.

It is still another object of this invention to provide a simplified and improved inductive element useful in memory systems.

It is another object of this invention to provide an improved and reliable woven memory system utilizing magnetic wires for both storage cores and for selection inductors with the magnetic wires woven with sense and control conductors into a common structure.

In accordance with the principles of this invention, a woven memory system is provided in which storage and inductive selection elements of magnetic wires having conductors wound or spun therearound in helices of selected pitches, are in turn woven with suitable sense and control conductors so that the storage and inductive selection structures are assembled in a single operation. The storage elements and the inductive selection elements may be woven as the woof of a metal fabric with sense and control wires woven as a portion of the warp at bit storage positions along the storage wires. On both sides of each bit position, biasing arrangements which may be wires conducting DC (direct current) are woven in the warp direction to establish magnetic regions for providing isolation between adjacent bit positions. The conductors wound around adjacent pairs of a storage element and a selection element are connected in series at one end and respectively connected to column selection conductors and row selection conductors at the other ends. Reading and writing operations are selected to be of such time periods that only the inductive selection element energized by both the column and row selection conductors is saturated during the reading or writing time period to pass switching currents through the conductor of the series connected storage element. The conductors of the storage elements may be woven as parallel helices to develop uniform magnetic fields while allowing a ratio of the pitch thereof relative to the pitch of the conductor of the selection element for reliable current control during a selection and switching operation.

The novel features of this invention, as well as the invention itself, both as to its organization and method of operation, will best be understood from the accompanying description, taken in connection with the accompanying drawings in which like reference characters refer to like parts and in which:

FIG. 3 is a plan view of the woven memory system of

Figure 1:
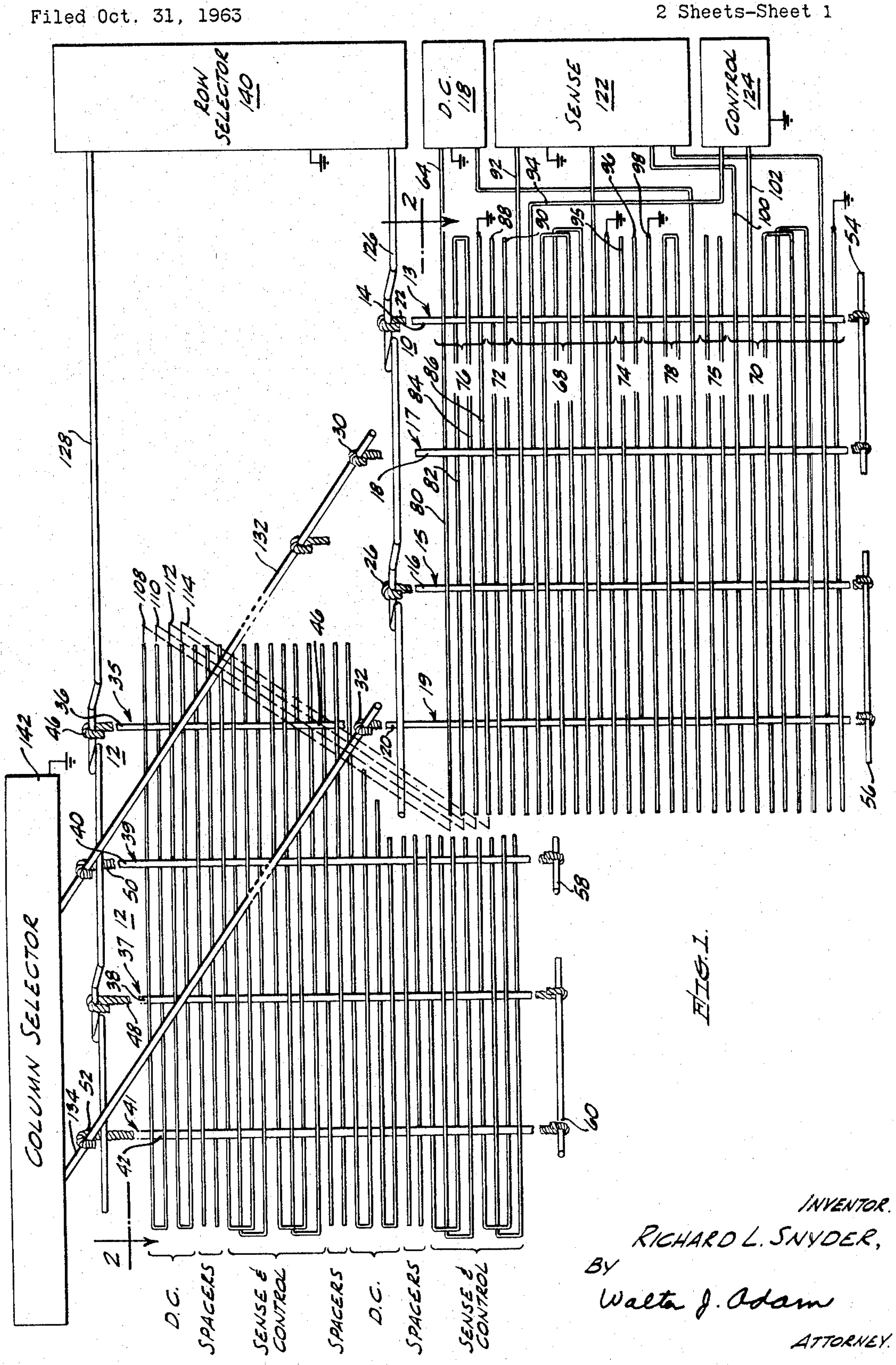
FIG. 1 is a schematic perspective drawing of a woven memory system in accordance with the principles of the invention showing the improved selection and storage structures utilizing magnetic wires and showing the DC isolating conductors positioned between storage regions.
Figures 2, 4, 5, 6:
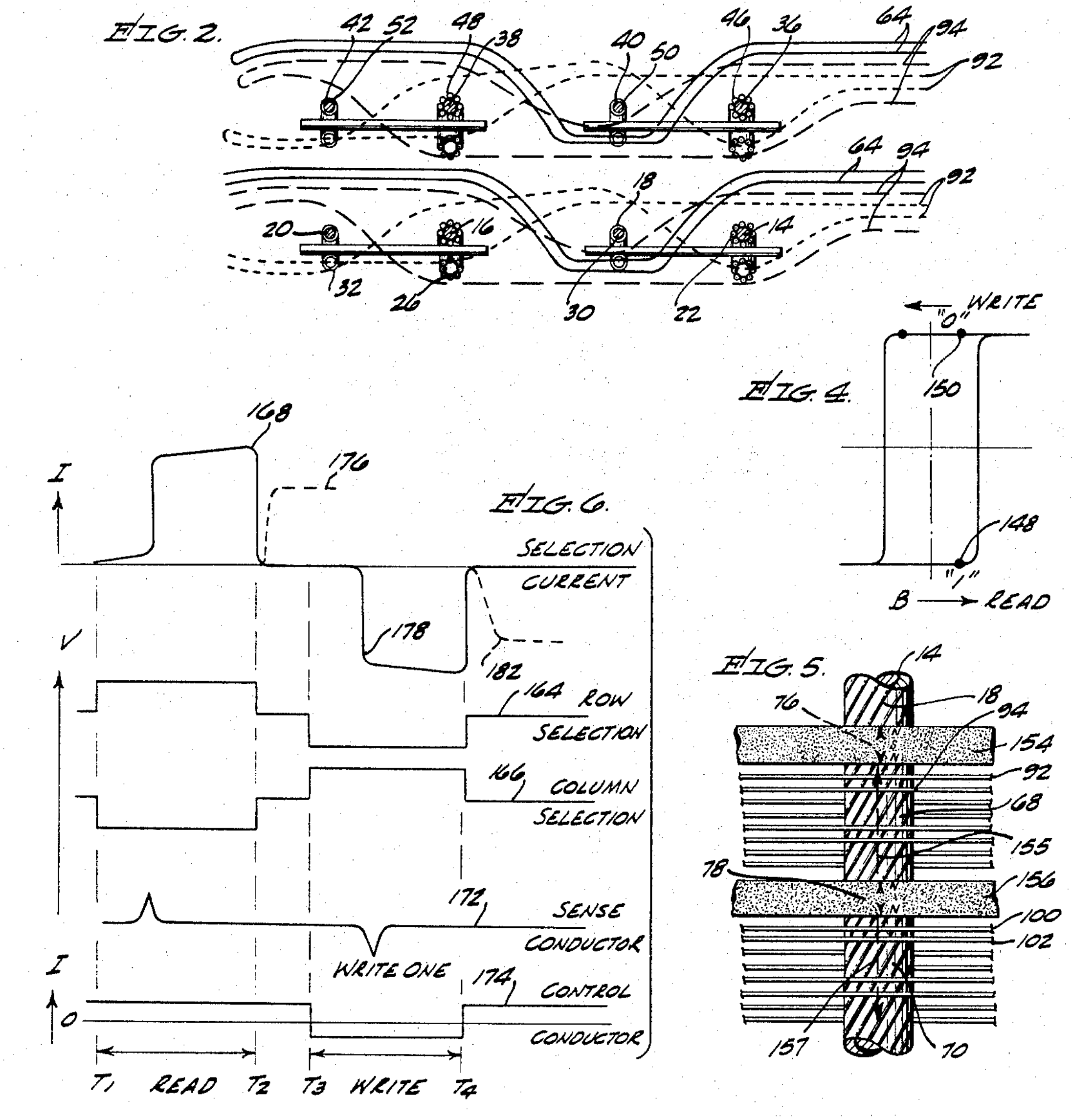
FIG. 2 is a sectional view taken at line 2—2 of the woven memory system of FIG. 1 for further explaining the arrangement of the magnetic wires and the conductors.

FIG. 1 for explaining the connecting arrangement of the row and column selection conductors;

FIG. 4 is a diagram of flux density B versus magnetic field H showing the hysteresis loop and the biased stable points of the magnetic storage wire utilized in the system of FIG. 1;

FIG. 5 is a schematic diagram of a word storage line in accordance with this invention for providing isolating regions between the storage regions along the magnetic wire by utilizing a permanent-magnet arrangement rather than the DC isolating conductors of FIG. 1; and FIG. 6 is a schematic diagram showing waveforms of current and voltage as a function of time for further explaining the operation of the system of FIG. 1.

Referring to the perspective drawing of FIG. 1 as well as to the sectional drawing of FIG. 2 taken at line 2—2 of FIG. 1, the woven arrangement of the word organized memory system in accordance with this invention will first be explained. It is to be recognized that the principles in accordance with the invention are not to be limited to a word organized selection system but are equally applicable to other types of selection systems as are well known in the art. The memory system includes storage rows 10 and 12 with the structure folded to provide additional rows of similar elements therebetween, the additional rows being omitted for convenience of illustration. The storage row 10 includes storage elements 13 and 15 which in turn respectively include storage or word lines 14 and 16. A wire formed from a suitable magnetic material such as a nickel-iron composition may be utilized for the storage lines 14 and 16. Adjacent to each storage element 13 and 15 are respective inductive selection elements 17 and 19 respectively including inductive selection lines 18 and 20 which also may be wires of a magnetic material similar to that of the storage lines. It is to be noted that the storage lines 14 and 16 may have similar properties and characteristics such as magnetic coercivity and wire diameter as the inductive selection lines 18 and 20 in accordance with one arrangement of the invention. A helix of parallel storage line conductors 22 is wound around the storage line 14 to apply a uniform and continuous magnetic field thereto in response to current flowing in parallel through the conductors 22, while at the same time having a desired pitch or turns per unit length of the word line 14, as will be explained subsequently. Similarly, the storage line has a plurality of storage line conductors 26 wound therearound in a selected parallel helix configuration.

The selection line 18 has a selection conductor 30 wound therearound with a pitch which may, for example, be substantially less than that of the storage conductors 22, that is having less turns per unit length than does each of the conductors 22. The selection line 20 which is associated with the storage element 15 also has single conductor 32 wound thararound with a desired pitch similar to that of the selection conductor 30, which may be relatively small compared to that of each of the conductors 26. In a similar manner, the storage row 12 includes storage elements 35 and 37 respectively including word storage lines 36 and 38. Also included in the storage row 12 are selection elements 39 and 41 respectively including selection lines 40 and 42. The storage lines 36 and 38 and the selection lines 40 and 42 may be wires of a suitable magnetic material such as a nickel-iron composition similar to the other storage lines and selection lines. Parallel helix storage line conductors 46 and 48 are wound around the respective storage lines 36 and 38 and selection conductors 50 and 52 are wound around the respective selection lines 40 and 42 with the selection conductors having a pitch relative to the pitch of the storage conductors similar to the pitch ratio in the storage row 10.

To form the memory system of FIG. 1, a continuous weaving process may be utilized to provide a single elongated woven wire strip extending from the storage row 10 through the storage row 12. After construction, the elongated woven strip is folded to form the plurality of storage rows such as 10 and 12. In one arrangement in accordance with the invention, the storage elements 13, 15, 35 and 37 and the selection elements 17, 19, 39 and 41 exted in the woof direction with the other conductors shown extending in the warp direction as defined by a fabric being woven on a conventional cloth or wire loom. As is well known in the art, mechanical weaving may be performed by periodically lifting selected warp wires by hettles and passing a shuttle device containing a spool of wire in a direction orthogonal to the warp wires and through the open path provided by the raised warp wires. The wire contained in the shuttle is the storage element or the selection element previously wound or spun with the helical conductors therearound. The system in accordance with the principles of this invention may be woven with either hand looms or automatic looms, for example. The storage elements and switching elements may be passed among the woof wires after the hettles have been raised without rolling on a spool in a shuttle if desired. The weaving operation which may utilize reeds to tightened each storage or selection conductor, may be adjusted so that the storage and selection elements passing in the woof direction are maintained relatively straight although this condition is not necessary for satisfactory operation in accordance with the invention. Although the weaving operation has been explained with the storage and selection elements extending in the woof direction, these elements may also be woven in the warp direction with the orthogonal conductors extending in the woof direction in accordance with the principles of the invention.

It is to be noted that although for convenience of illustration only two storage elements are shown in each storage row such as 10, many storage elements may be included in each storage row in accordance with the principles of this invention.

After the weaving operation is completed, the storage element 13 and the selection element 17 are bent around a connecting bar 54. Also the storage element 15 and the selection element 19, the storage element 35 and the selection element 39, and the storage element 37 and the selection 21 element 41 are bent or positioned around respective connecting bars 56, 58 and 60. In some construction operations, the connecting bars 54 and 56 and the connecting bars 58 and 60 may be a single conductor while the word wires and the selection wires are positioned thereon with the conductor being cut to the length shown after the bending operation. The connecting bars 54, 56, 58 and 60 may then be dipped into molten solder for connecting the conductors such as 22 and 30 to the bar 54 and the conductors such as 26 and 32 to the bar 56, for example. It is to be noted that the resistance of the magnetic wire such as 14 is relatively high so that this type of connection results in the majority of applied current flowing through the helical conductors. The helical word conductors such as 22 and selection conductors such as 30 as well as other conductors utilized in the system of FIG. 1 may be of any suitable conductive material such as copper wire, for example, coated with a suitable insulation such as enamel.

To explain the positioning of the woof and warp wires which may be similar in all of the storage rows such as 10 and 12, the relative positioning of the wires will be explained principally in the storage row 10. The magnetic storage lines such as 14 include a plurality of storage regions or areas such as 68 and 70 with each storage line including as many storage regions as are utilized to represent a word in binary form. On both sides of each storage region such as 68 and 70, spacing regions such as 72, 74 and 75 may be provided in some arrangements in accordance with this invention. Adjacent to the spacing regions such as 72 and 74, are isolated regions 76 and 78, which regions are maintained in a magnetically saturated condition for isolating one storage region from another along the word line 14, that is to prevent the flux change in one storage region from developing flux changes in the adjacent magnetic material that may affect the magnetic state of the adjacent storage region. The isolating regions such as 76 and 78 prevent storage regions or domains from migrating or extending along the storage line, which condition may occur after repeated operations. To form the isolating regions such as 76, a DC (direct current) bias line or conductor 64 may be woven with the word storage element 13, the selection element 17, the word storage element 15, and the selection element 19 properly positioned by skipping stitches where appropriate. It is to be noted that because the current flows through sections 80 and 84 in direction opposite to the current in sections 82 and 86 because of connections at the two ends of the array, the conductor sections 80 and 84 are positioned on opposite sides of storage elements 13 and 15 from the sections 82 and 86. Also the DC bias line 64 is woven so that all sections are positioned on the same side of the selection elements 17 and 19 so as to prevent enclosing of these elements which would apply magnetic fields thereto. Because of the arrangement of the sections of the DC bias line 64, magnetic fields are applied to the storage lines such as 14 and 16 so that the isolating regions such as 76 are maintained in a saturated magnetic condition. Although in the arrangement shown, magnetic fields are not applied to the selection elements such as 17 and 19 and magnetic isolating regions are not developed thereat, the saturated operating of the selection elements such as 17 and 19 at positions corresponding to storage regions such as 68 would provide satisfactory operation in accordance with the invention even if isolating regions were developed in the selection lines such as 18 and 20. The spacing regions such as 72 are formed by weaving a desired number of spacing conductors such as 88 and 90 with the storage elements and the selection elements.

Adjacent to the storage regions such as 68 of the word storage lines such as 14, insulated sense and control conductors are woven to effectively form conducting bands. In one arrangement, sense conductors such as 92 may be alternately positioned with control conductors such as 94 so as to provide a sensing system separate from the bit control system. However, it is to be understood that in other arrangements in accordance with the principles of this invention, the entire band of conductors 92 and 94 may be connected to provide a single sense and control conductor utilized for conducting sensed signals during a reading operation and for applying information pulses during a writing operation. As is well known in the art, a word organized memory system may be operated with only two conductors coupled to each magnetic storage element. The sense conductor 92 is woven by appropriate skip weaves so that each adjacent section is positioned on opposite sides of adjacent storage elements such as 13 and 15 to loop these elements along the storage row 10 and on the same sides of all of the selection elements such as 17 and 19. This positioning of the sense conductor relative to the selection elements prevents signals being induced therein from selection elements changing magnetic state. The skipping of the sense conductor at alternate inductive selection elements such as 17 and 19 maintains the stability of the woven material. Because the sense conductor is passed around adjacent storage elements such as 13 and 15 on different sides thereof, the signals developed by small switching currents flowing through unselected inductive selection elements will be cancelled. To provide this cancellation at unselected word storage lines in the column direction such as along the column selection conductor 132, an extra inductive element or storage element (not shown) may be woven at the folding position of the array so that the loops of the sense conductor have an opposite polarity relation in each storage row at storage elements in corresponding positions such as 13 and 35. These additional elements in the folded region are not utilized in the reading and writing operations, so they are not connected to the row and column selection conductors. It is to be noted that in the arrangement shown, a sense circuit 122 senses bipolar pulses.

The control conductor 94 is woven in the warp direction so that each horizontal section is on the same side of each of the inductive selection elements. To maintain this condition and establish the control conductors in stable positions, the sections of the control conductor may skip a stitch at alternate selection elements. Because the loops of the control conductor 94 do not enclose the inductive elements, current flowing through the control conductors does not affect the saturation time of unselected inductive selection lines such as 20.

The spacing region 74 includes suitable spacing conductors such as 95 and 96 and may, for example, have a plain over and under weave. It is to be noted that spacing may also be provided by omitting the weaving of any warp wires at those positions in accordance with the principles of the invention. The isolating region 78 may be woven with a DC conductor 98 in an arrangement similar to that of the DC conductor 64. In accordance with the principles of the invention, current may flow in opposite directions through the conductors of adjacent bias regions to develop like magnetic poles (either north or south poles) adjacent to both ends of each storage region such as 68 so that a stored magnetic state always forms a domain wall at one end of the storage region. A domain wall is formed by two regions of opposite magnetic polarities being adjacent to each other. In this condition of like magnetic poles at the adjacent edge of the isolating regions at both ends of each storage regions, the magnetomotive force required to change the magnetic states of the storage regions such as 68 is similar for both stored "zero" and "one" states because the conditions of either two domain walls for one state or the absence of domain walls for the other state in the edges of the storage regions are not developed. In the second storage position 70, a sense conductor 100 and a control conductor 102 may be woven in a manner similar to the respective sense conductors 92 and the control conductor 94. The woven position of the conductors in the entire word length of the woof direction of the structure may be similar to that previously explained.

The other storage rows of the woven structure such as the storage row 12 are similar to the storage row 10. The DC biasing conductor 64 may be connected as shown by the dotted lines 108, 110, 112 and 114. The biasing conductor 64 is connected so that DC current applied from a source 118 flows through all wire sections of all storage rows to apply fields to only the word lines. The DC source 118 is also utilized for applying current to other biasing conductors in the word direction of the structure such as the DC biasing conductor 98. Each of the sense conductors such as 92 and 100 have their wire segments interconnected so that a sensed signal in the corresponding bit storage position in any selected storage line of the array is applied thereto in series. The sense conductors such as 92 and 100 apply sensed signals to the sense circuit 122 which may include a plurality of sense amplifiers (not shown) responsive to signals of either polarity. The sections of the control conductors such as 94 and 102 are interconnected at the ends of the storage rows 10 and 12 so that magnetic fields are developed in the same directions along the storage regions of each of the word storage lines in response to DC current or pulses applied from a control pulse source 124.

Figure 3:
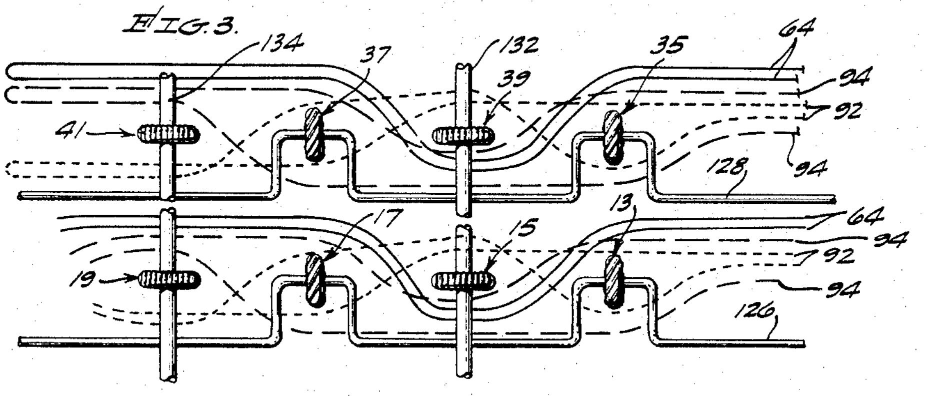

After completion of the weaving process and folding of the elongated array into a plurality of storage rows such as 10 and 12, the final connections may be formed to complete the memory structure. As discussed previously, the connecting conductors such as 54 and 56 may be soldered prior to the folding operation. After the array is folded, the storage elements such as 13 and 15 and the storage elements such as 35 and 37 are positioned around respective row selection conductors 126 and 128. Also at this time, or subsequently, the selection elements such as elements 17 and 39 and elements 19 and 41 are positioned around respective column selection conductors 132 and 134 as may be seen in FIG. 3. Both the row selection conductors and the column selection conductors may be positioned a sufficient distance from the remainder of the array so that connections may be made by dip soldering the selection conductors. As discussed previously, the relatively high impedance of the magnetic material of the word lines such as 14 and the selection lines such as 18 results in substantially the majority of the current passed between the row selection and word selection conductors flowing through the conductors such as 22 and 30. Row selection of the completed memory system is provided by applying appropriate pulses of a predetermined first or second polarity through the row conductors such as 126 or 128 from a row selection pulse source 140 and by applying column selection pulses of an opposite polarity through a selected column selection conductor such as 132 or 134 from a column selection pulse source 142. As discussed previously, selection of a row selection conductor such as 126 and a column selection conductor such as 132 allows current to pass through only one word storage conductor such as 22 and the series connected inductive selection conductor 18 because of the time discrimination of the inductive elements.

In the word organized system in accordance with the invention, the combined magnetomotive force for switching the binary states of the storage regions of the magnetic wires is developed in response to current flowing in a word conductor such as 22 and current flowing in control conductors such as 94 and 102. A direct current flows through all of the control conductors such as 94 and 102 during reading, in such a direction that the magnetizing force developed thereby adds to that developed by the current in the storage conductor. The currents in the storage conductors such as 22 may contribute two-thirds of the total magnetizing force and the DC current in the control conductors such as 94 may contribute one-third of the total magnetizing force required to switch a storage region to an opposite magnetic state. These combined magnetic forces are sufficient to switch all of the storage positions such as 68 and 70 of a selected storage element that are in a state to be switched. As may be seen by the hysteresis curve of FIG. 4, the magnetic condition of storage regions or cores in the binary "one" state are switched during reading to induce output signals in the sense conductors such as 92. The DC bias current normally maintains a storage region storing a "one" at a point 148 which is a stable condition. During reading, all storage positions of a selected storage element storing a "one" are switched to a "zero" state and those regions storing a "zero" at a point 150 only change state temporarily toward the saturation region. Thus the biasing field applied to the storage regions in response to DC current supplied from the control source 124, eliminates the requirement of applying pulses to the control conductors during reading. It is to be noted that because transient pulses are not applied to the control conductors during reading, unselected storage elements are not disturbed so as to develop undesired noise signals.

During the writing operation, a current pulse of two-third amplitude is applied through the selected storage conductor such as 22 in a direction opposite from that during reading and, in some arrangements, of the same amplitude as during the reading operation. If the DC bias current is maintained in a control conductor such as 94, which current is in a direction to develop a field that cancels a portion of the field developed by the pulse applied to the storage conductor, the magnetic material of the storage region such as 68 is not switched because a field of only one-third of the required amplitude for writing a "one" is applied thereto. To write a binary "one" a reverse current pulse opposite from the direction of the normally flowing DC current is passed through the control conductor such as 94 which generates a one-third amplitude field that combines with the two-thirds amplitude field resulting from the current flowing through the word conductors 22 so that the storage region is switched to the binary "one" state and changes to the point 148 of FIG. 4. This DC biasing arrangement allows writing to be performed by applying a pulse to the control conductor only when a "one" is being recorded, for example, resulting in simplified pulse forming circuits.

Thus, the ferromagnetic cores in accordance with the invention are a relatively long segment of magnetic material such as the storage region 68 of a relatively small diameter wire. For example, if the storage line 14 is wire of 0.001 inch in diameter, a segment one quarter inch long functions essentially as a stable ring shaped core. The very large length to diameter ratio results in the demagnetizing effects of the air conducted flux being negligible so that the segment is not required to close on itself to sustain stable magnetic domains.

The parallel helix conductors such as 22 provide an improved arrangement for forming the word storage elements such as 13 when a ferromagnetic wire is utilized for the binary storage medium. The pitch of the word conductors 22 determines the characteristics of the magnetizing field that is generated when a current is passed therethrough. If a short pitch helix is utilized, that is if each of the conductors is wound with close spacing along the longitudinal axis of the magnetic wire, a large number of turns will be provided per unit length of magnetic wire and only a relatively small current is required to flow through the storage conductor to generate a specific magnetizing field. If a long pitch helix is utilized for the storage conductors, relatively few turns exist per unit length of magnetic wire and relatively large currents are required to flow through the storage conductors such as 22 to develop the same magnetizing field. A short pitch helix winding generates more induced voltage when the storage region is switched to an opposite magnetic state than does a long pitch helix winding because more conductors are cut by the flux change.

In the word conductors such as 22, it is desirable to have a relatively small voltage developed for each storage region such as 68 that is switched because the voltage developed in the entire storage conductor is proportional to the number of storage regions that may switch in the word storage line. The voltage induced in the word storage conductor such as 22 effectively provides an impedance to current flow therethrough at switching times. Because the number of binary bits that are switched along a word line changes in a random manner, the effective impedance to current flow through the word conductor also changes. By utilizing a long pitch winding for the storage conductors such as 22 so that relatively small voltages are developed when the storage regions change state, and by providing a relatively large resistance in the path of current flow therethrough, current stabilization is provided. Also the driving voltages applied to opposite ends of the storage conductors such as 22 may have a reasonably small differential when the storage element is formed with a long pitch winding. The resistance in the word selection path may be provided either in the row and column selector circuits 140 and 142 or by selection of the material for the word storage conductors such as 22 or the selection conductors such as 30.

The pitch of the word conductors such as 22 along the storage lines such as 14 is also based on a consideration of the word line selection arrangement in accordance with the invention. A storage element is selected by connecting a non-linear reactance in series with each word storage conductor such as 22 and applying voltage pulses of opposite polarity to opposite ends of the series path. The series paths of a word conductor and a switching conductor having one end connected to one of the two active row or column selection conductors have only one-half of the voltage applied thereacross as is applied across the selected inductive selection element. The remaining series paths of a selection element and a word conductor do not have voltage differential applied across the two ends. Because the selection inductors are saturating non-linear elements having conductors connected in series with the conductors of each of the word conductors, switching is thus affected by a time discrimination process. The pitch of the selection conductors such as 30 determines the period and driving voltages that are required to saturate the selection lines such as 18. If the selection line 18 has the magnetic material thereof magnetized at a $-B_r$ state, and a current is passed therethrough in a direction to magnetize the core material in the positive direction, a voltage pulse applied to the switching conductor such as 30 will allow only that current necessary for magnetizing the conductor to flow therethrough. If the voltage pulse or pulses subside before the selection line reaches positive saturation, only magnetizing currents flow through the conductor during the pulse times. However, if the voltage pulse lasts until the selection line goes to positive saturation, much larger currents will flow through the conductor because the flux is no longer changing and the induced voltage falls to "zero." In this condition the current flowing through the selection conductor is only limited by the resistance of the conductors themselves and the voltages induced in the storage conductor. The rate of change of the flux in the inductive switching line such as 18 is proportional to the voltage applied across the windings or the conductor. Applying twice the voltage amplitude across the selected selection conductor allows saturation to occur in approximately one half the time as when applying a single voltage amplitude.

If the voltage pulse durations applied to the selection conductors are chosen so that the selected inductive selection line such as 18 saturates in approximately one half of a pulse time or less, this selected inductor will allow a large switching current to flow through the selection conductor wound therearound while all of the other selection conductors in the memory array pass only a relatively small current. It is to be noted that because the word selection pulses applied to the row selection conductors such as 126 and the column selection conductors such as 132 always occur in identical pairs of opposite polarity for reading and for writing, the selection line reactors such as the line 18 always return to their initial state.

In one arrangement in accordance with this invention the selection line 18 and the storage line 14 are formed of magnetic material having the same properties such as coercivity and having the same diameter. Thus, as the selection line conductor such as 30 has a selected number of turns per unit length which is greater than the number of turns per unit length of the storage line, the selection line will change its flux with only a fraction of the current required to change the magnetic state in the storage line such as 14. While the selection line 18 is being driven into a saturated state, the storage line 14 is substantially undisturbed so that it is switched with the maximum flux change after completion of the selection operation. Thus, the selection of pitch of the conductor around the selection line relative to the pitch of the conductors around the storage line allows the selected inductive selection line to reach saturation substantially without disturbing the magnetic state of the associated storage line and allows the increased current to switch the storage regions of the word line at a predetermined time. Also, because of the selected pitch of the selection conductors such as 32, a very small current is passed through unselected switching conductors connected to only one active row or column selection conductor.

If the long pitch helix conductors such as 22 wound on the storage line such as 14 is a single wire, each magnetic field vector along the storage line has components on the opposite side of the storage line at substantially different axial positions. Thus, axial switching field components of appreciable magnitude would only be present at the material of the storage line adjacent to the word storage conductor. As a result, the storage line such as 14 would switch in only certain regions during reading and writing operations and the material of the entire storage region would only be partially switched. Thus the sensed signals would have varying amplitudes as different amounts of magnetic material are switched during reading. In order to provide a uniform magnetic field, while maintaining the desired pitch, the word conductors such as 22 are formed of a plurality of parallel helices which are insulated conductors wound around the word line parallel to each other. Current passing in parallel through the word conductors such as 22 provides a uniform axial magnetic field without a circular component resulting in total switching of the bit storage region. It is to be noted that the same amount of current flows through the combined parallel conductors such as 22 as flow through the single selection conductor such as 30. Because the word conductors are insulated, the circumferential field component cancels around the word line and only the axial switching component remains. Therefore, the parallel-helical winding configuration of the conductors around the word lines such as 18 allows the use of a desired winding pitch while providing consistent and uniform magnetic switching operations.

It has been found that when the storage regions such as 68 and 70 are closely spaced along the storage lines such as 14, the changing of the magnetic state in one storage region may change the magnetic state of the adjacent separating region which in turn may affect the magnetic state of a portion of the adjacent magnetized storage region. The isolating regions provided in accordance with this invention, maintain regions such as 76 and 78 in a magnetized state which may be in or near a saturated condition. Thus switching of a storage region such as 68 has substantially no effect on the adjacent storage region such as 70 because of the absence of flux changes in the isolating region 78. As discussed previously, it has been found to be desirable in accordance with the invention, to provide similar magnetic poles on both sides of each storage region such as 68 by connecting the DC lines such as 64 in an appropriate manner. The spacing between the storage region such as 68 and the adjacent isolating regions such as 76 and 78 as provided by spacing wires 88 and 90 and wires 95 and 96 results in improved switching of the storage regions when such regions are relatively short, by eliminating any magnetic interference that may occur with the saturated isolating region. If the storage regions are of sufficient length, the magnetic domains may be switched within the storage region without separate spacing regions. It is to be noted that the storage regions such as 68 must be of sufficient length to support stable magnetic domains.

Referring now to FIG. 5, another arrangement in accordance with this invention shows the storage line 18 wound similar to that of FIG. 1 except the isolating regions such as 76 and 78 are formed by the fields developed from a permanently magnetized structure such as magnetic strips 154 and 156. Conventional Mylar tape coated with highly retentive magnetic material and magnetizing in the regions adjacent to the storage lines may be utilized for the magnetic strips 154 and 156. Because it may be desirable to prevent the formation of isolating regions in the selection lines such as 18, the strips 154 and 156 may be magnetized in periodically positioned regions therealong adjacent to only the storage lines. It is to be noted that as shown by the North and South direction of magnetization of the strips 154 and 156, magnetic poles of similar polarity may be provided on both sides of each storage region such as 68. However, it is to be understood that other polarity relations of the isolating regions relative to the storage regions may be provided in accordance with the principles of the invention. Dotted arrows 155 and 157 of the respective storage regions 68 and 70 show the direction of axial magnetization which may respectively represent a stored binary "zero" and a binary "one," for example. Thus the isolating principles in accordance with this invention are not to be limited to any particular arrangement for providing the magnetized or the saturated isolating regions but includes formation thereof by either passing current through appropriate conductors or by providing permanently magnetized structure, for example.

Referring now to FIG. 5, another arrangement in ac- to the memory array of FIG. 1, the operation of the system in accordance with the invention will be explained in further detail. At a time $T_1$, which is the beginning of a read operation, positive and negative pulses of respective waveforms 164 and 166 are respectively applied to selected row and column conductors such as 126 and 132. As a result, twice the voltage is applied across the selected inductive selection conductor 30 as is applied across unselected selection conductors such as 32. The short pitch of the selection conductor 30 results in a relatively high impedance to current flow being developed therein. Thus, the selection conductor 18 passes a relatively small but substantially larger current than through unselected selection elements until the selection line 18 changes magnetic state. When the selection line 18 changes state and be comes magnetically saturated, the flux change is terminated and the impedance presented at the selection line 18 is essentially only the resistance of the conductor 30. Thus, the current flowing through the selection conductor 30 and the parallel storage conductors 22 increases a selected period after time $T_1$ to a relatively large value as shown by a waveform 168. The selected turns ratio or pitch of the conductors of the selection element 17 relative to the storage element 13, results in the storage regions such as 68 and 70 being relatively undisturbed during this selection period because of the small currents required to change the selection line 18 to a saturated state relative to the currents required to substantially affect the magnetic state of the storage line 14. This increased current flowing through the word conductor 22 after the selection element 17 is saturated in combination with the DC current of a waveform 174 passing through the control lines such as 94 causes the storage regions such as 68 of the word line 14, when storing a binary "one" (FIG. 4), to change state and develop a pulse as shown by a waveform 172. Substantially the majority of the flux change of the storage region such as 68 occurs after the rise of the pulse of the waveform 168. Because of the long pitch of the storage conductors 22, the switching current flowing therethrough remains substantially constant in response to a relatively small voltage differential applied thereacross. Although a relatively long pitch for the storage conductors such as 22 results in relatively large switching currents of the waveform 168 being required for switching the storage lines such as 14, the switching currents for substantially large memories in accordance with the invention are well within the capacity of conventionally known control and pulse forming circuits. It is to be noted that because the sense conductors are wound alternately on opposite sides of the storage elements, signals induced as a result of small currents passing through unselected inductive selection elements are effectively cancelled in the sense line.

Substantially at time $T_2$, the pulses of the waveforms 164 and 166 are terminated, the current pulse of the waveform 168 falls and the read operation is completed. A dotted waveform 176 shows the time required to saturate an unselected inductive selection line such as 20 to allow increased current to flow through the conductor 32 in response to a voltage pulse such as the pulse of the waveform 164 or of the waveform 166 applied to only one end thereof. Thus the reading operation is completed without unselected inductive selection lines becoming saturated. It is to be noted that during the reading operation, a pulse is not required to be applied from the control pulse source 124. Between times $T_2$ and $T_3$, a period may be provided to allow recovery of driving circuits such as the row selection source 140 and the column selection source 142.

At a time $T_3$ which is the start of the write operation, a negative and a positive pulse of the respective waveforms 164 and 166 are applied to the respective row selection conductor 126 and the column selection conductor 132, for example. Thus, the selection line 18 is driven to the opposite magnetic state and is saturated a short period after time $T_3$. As a result, a relatively large current of a waveform 178 is passed through the word conductor 22. In those control lines such as 94 in which a binary "one" is to be recorded, a negative pulse of the waveform 174 is applied to develop a field to combine with the field developed by the current passing through the word conductor 22. For writing a "zero" into a bit storage region, the DC bias of the waveform 174 is maintained in the corresponding control line and the magnetic material essentially remains in the "zero" state of point 150 of FIG. 4. At a time $T_4$, the pulses of the waveforms 164, 166 and 174 are terminated and the writing operation is completed. A dotted waveform 182 is shown to indicate the time required for saturating the unselected inductive selection lines such as 20. It is to be noted that because current is always passed through the selection line conductor in opposite directions during reading and writing, the selected selection line such as 18 continually changes to the opposite magnetic state and into a saturated condition.

Thus, the current flowing through the selection conductor such as 30 is determined by the row and column selection voltages and the effective impedance which may be considered the voltages induced in the selection conductor by the selection line such as 18, which induced voltages are a function of the pitch of the winding. The selection current is not required to be limited during the selection period. The current flowing through the storage conductors such as 22 is a function of the selection voltages and the resistance in the current path such as the resistance in the selection pulse sources 140 and 142 and the resistivity of the selection conductor such as 30, and is limited to a value to develop magnetic fields of two-thirds amplitude, for example, of that required for switching a storage region. By adjusting the currents through the storage conductors such as 22 and the control conductors such as 94, the switching of storage regions is completed during the read or the write time periods. The relatively large pitch of the storage conductors such as 22 requires that a relatively large current be passed through the storage conductors to provide switching during the selected time period. Thus, the switching time is determined by selecting the currents flowing through the storage conductor and the pitch of the storage conductor with the parallel helix configuration of the conductors 22 allowing a selected pitch to be utilized while applying a uniform field to the storage regions. The pitch ratio of the selection conductor and the storage conductor assures that the storage regions are substantially undisturbed during the selection operation.

Also in accordance with the principles of this invention, other arrangements may be utilized for the storage lines and selection lines such as structures coated with magnetic material. Also, the storage lines may be formed from lengths of magnetic wires connected between each storage region by sleeves of a plastic material such as Mylar to provide gaps between the magnetic material. However, if a connecting material is provided between storage regions, the memory structure may be more expensive and difficult to construct than with continuous magnetic wires. In accordance with the invention, the storage lines and selection lines may be formed of the same magnetic material and of the same diameter for reliable design and operation. However, the principles of the invention are also applicable to systems utilizing material of different properties and characteristics for the storage lines and the selection lines with the selected turns ratio being determined by appropriate considerations of the different properties of the two groups of magnetic wires.

Thus there has been provided a simplified and easily constructed memory system that in some arrangements in accordance with the invention may be constructed by weaving procedures such as on a manual or automatic loom. The word selection system utilizes an inductive selection system to prevent current from passing in either direction through unselected word storage elements. The selection system is formed by switching inductors that are woven within the array to reduce the external circuits. The parallel helix winding of the word conductors which provides a uniform magnetic field allows the system to operate with any desired ratio of currents between selection and switching so that magnetic storage regions are only substantially affected after the selection operation is completed. In one arrangement in accordance with the invention, the magnetic word storage wire and the selection wire may be of the same magnetic material and diameter to simplify the weaving operation and so that the relative effect of the selection operation on the storage element is substantially determined by the pitch ratio of the conductors wound around the magnetic selection wires and the magnetic word storage wires.

What is claimed is:

1. A memory device responsive to a voltage differential comprising first and second magnetic wires of a material having a magnetic retentivity, first and second conductive wires respectively positioned around said first and second magnetic wires in helical configurations, said first and second magnetic wires coupled together at first ends and responsive to the voltage differential at the other ends, said first and second conductive wires having a ratio of pitches therealong so that a relatively small current flows therethrough while said first magnetic wire is magnetized and a relatively large current thereafter, and means coupled to said second magnetic wire for selectively applying magnetic fields thereto and for responding to changes of magnetic state thereof.

2. A woven memory system comprising a plurality of pairs of first and second magnetic wires each having conducting means woven therearound in a helical configuration, with the conducting means around said first and second wires having a selected pitch ratio, a plurality of conductors woven substantially at right angles to said magnetic wires and magnetically coupled to said first magnetic wires, means for coupling the conductive means at first ends of each of said pairs of magnetic wires, means for applying voltage pulses to the second ends of the conductive means associated with a selected pair of said magnetic wires, said pitch ratio selected to provide a relatively small current flow while said second magnetic wire is being magnetized and to provide a relatively large current when said first magnetic wire is magnetized, means coupled to said plurality of conductors for selectively applying current pulses thereto, and means coupled to said plurality of conductors for responding to changes of magnetic state of said second magnetic wires.

3. An informational storage system comprising first and second wires of magnetic material, a plurality of third and fourth wires of conductive material respectively positioned around said first and second wires in a helical configuration with first and second pitches to form respective inductive elements and storage elements, said third and fourth wires coupled together to form a series path, said first and second pitches selected so that a current passed therethrough magnetizes said inductive element without substantially changing the magnetic state of said storage element, first means coupled to each series path for applying voltage signals thereto, a plurality of fifth wires interwoven with said inductive elements and said storage elements substantially orthogonal thereto to magnetically couple said storage elements, second means coupled to said plurality of fifth wires for applying current signals thereto, and a plurality of sixth wires interwoven with said inductive elements and said storage elements substantially orthogonal thereto to sense the magnetic states of said storage elements.

4. A magnetic storage system comprising a plurality of pairs of a magnetic selection wire and a magnetic storage wire positioned substantially parallel to each other, said magnetic wires each having a conductive wire wound therearound with a selected pitch and coupled together in said pairs at a first end, the pitch of the conductive wire wound around said selection wire having substantially more turns per unit length of said selection wire than the pitch of the conductive wire wound around said storage wire, a plurality of conductors positioned substantially at right angles to and woven with said magnetic wires, said conductors providing sense and control wires at periodic positions along said storage wires and providing biasing wires on both sides of said periodic positions, means coupled to the second ends of the conductive wires around said selection wires and said storage wires, for applying voltage pulses of opposite polarity thereto to pass current pulses therethrough, means coupled to said sense and control wires for applying control pulses to establish selected magnetic states at said periodic positions and for responding to sensed signals, and means coupled to said biasing wires for establishing magnetized regions for magnetically isolating said periodic positions.

5. A woven magnetic storage system comprising a plurality of pairs of a magnetic selection wire and a magnetic storage wire positioned substantially parallel to each other, said selection wires each having a selection conductor wire wound therearound in a helical configuration with a first pitch and said storage wires each having a plurality of parallel storage conductor wires wound therearound in a parallel helical configuration with a second pitch, said selection conductor wire and said storage conductor wires of each pair coupled together at a first end, a plurality of control conductors woven with said magnetic storage wires and said magnetic selection wires substantially orthogonal thereto to establish storage regions at periodic positions along said magnetic storage wires, a plurality of sense conductors woven with said magnetic storage wires and said magnetic selection wires substantially orthogonal thereto at each of said storage regions, a plurality of biasing wires woven with said magnetic storage wires and said magnetic selection wires substantially orthogonal thereto to establish isolating regions on both sides of each storage region, first means coupled to the second ends of the selection and storage conducting wires for applying voltage pulses of opposite polarity to a selected pair thereof, second means coupled to said control wires for selectively applying current thereto, third means coupled to said sense wires for responding to changes of magnetic state in said storage regions, and fourth means coupled to said biasing wires for passing currents therethrough for maintaining said isolating regions magnetized substantially in a saturated state, whereby in response to the voltage pulses of said first means, said magnetic selection wire of the selected pair saturates in a predetermined period to pass current through the selection conductor wire to develop magnetic fields to switch said storage regions in combination with magnetic fields developed by current from said second means, said first and second pitches being selected so that said magnetic storage wire is substantially undisturbed during the predetermined period before said magnetic selection wire saturates.

References Cited

UNITED STATES PATENTS

| | | | |
|---|---|---|---|
| 3,011,158 | 11/1961 | Rogers | 340—174 |
| 3,031,648 | 4/1962 | Haber | 340—174 |
| 3,105,962 | 10/1963 | Bobeck | 340—174 |
| 3,154,769 | 10/1964 | Blades | 340—174 |
| 3,221,312 | 11/1965 | MacLachlan | 340—174 |
| 3,264,621 | 8/1966 | Gray | 340—174 |
| 3,286,242 | 11/1966 | Gianola | 340—174 |

BERNARD KONICK, *Primary Examiner.*

JAMES W. MOFFITT, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,404,384 October 1, 1968

Richard L. Snyder

It is certified that error appears in the above identified patent and that said Letters Patent are hereby corrected as shown below:

Column 3, line 53, before "single" insert -- a --. Column 4, line 20, "tightened" should read -- tighten --; line 41, cancel "21". Column 5, lines 27 and 28, "saturated operating" should read -- saturating operation --. Column 11, line 11, "structure" should read -- structures --; line 13, "Referring now to FIG. 5 another arrangement in ac-" should read -- Referring now to the waveforms of FIG. 6 as well as --.

Signed and sealed this 10th day of March 1970.

(SEAL)
Attest:

Edward M. Fletcher, Jr.
Attesting Officer

WILLIAM E. SCHUYLER, JR.
Commissioner of Patents